United States Patent [19]
Thornock et al.

[11] Patent Number: 5,887,822
[45] Date of Patent: Mar. 30, 1999

[54] SEGMENTED ENGINE FLOW CONTROL DEVICE

[75] Inventors: Russel L. Thornock, Seattle; Russell S. Brinton, Buckley; Joel E. Hansen, Issaquah; Leonard J. Hebert, Bellevue; Michael R. Holle, Newcastle; Jeffrey P. Kane, Renton; John G. Kladouris, Kent; Michael B. Scholey, Issaquah, all of Wash.

[73] Assignee: The Boeing Company, Seattle, Wash.

[21] Appl. No.: 827,523

[22] Filed: Mar. 28, 1997

[51] Int. Cl.⁶ .................................................... B64D 27/00
[52] U.S. Cl. ........................ 244/53 R; 244/54; 60/39.31; 60/226.1
[58] Field of Search ..................................... 244/121, 130, 244/53 R, 54; 60/39.11, 39.91, 39.31, 39.32, 226.1, 200.1

[56] References Cited

U.S. PATENT DOCUMENTS

| | | | |
|---|---|---|---|
| 3,101,920 | 8/1963 | Fradenburgh | 244/130 |
| 3,175,791 | 3/1965 | Toms | 244/130 |
| 4,427,169 | 1/1984 | Brown | 244/130 |
| 4,466,587 | 8/1984 | Dusa et al. | 244/130 |
| 4,712,750 | 12/1987 | Ridgwell | 244/54 |
| 5,524,846 | 6/1996 | Shine et al. | 244/53 R |

*Primary Examiner*—Galen L. Barefoot
*Attorney, Agent, or Firm*—Christensen O'Connor Johnson & Kindness, PLLC

[57] ABSTRACT

In a turbofan jet engine installation including a low pressure area (48) located between a primary exhaust nozzle (20) and strut fairings (30), an improvement including a fencing assembly (66) for reducing interaction of fan air (52) with air in the low pressure area. The fencing assembly (66) includes two pairs (70), (72) of opposed flow control fences (68) connected to the primary exhaust nozzle (20) at locations laterally outboard of the strut fairings (30). A first pair (70) includes fences formed of a single piece connected directly to the primary nozzle (20). A second pair (72) includes fences formed of a number of longitudinally spaced-apart segments (82). The segments (82) are connected to one face of an elongated attachment strap (84) with the opposite strap face being connected to the nozzle. Each fence includes a foot portion (78) and an upright portion (80) extending outwardly from the foot portion.

12 Claims, 3 Drawing Sheets

SEGMENTED ENGINE FLOW CONTROL DEVICE

FIELD OF THE INVENTION

The present invention relates to apparatus for aircraft engine nozzles, and more particularly, to apparatus for altering the aerodynamic characteristics of jet engine exhaust relative to low pressure/velocity airflow regions of the engine.

BACKGROUND OF THE INVENTION

In order to understand the nature of the present invention, it is helpful to first review various aspects of a turbofan jet engine. Below is a brief description of the exhaust components and fire safety elements of a turbofan jet engine, followed by description of the airflow dynamics associated with these elements during use.

With regard to engine exhaust components, FIG. 1 is a forward-looking perspective rear view of a primary exhaust nozzle 20 and a primary nozzle plug 22 of a turbofan jet engine. The primary exhaust nozzle is generally positioned at the aft end of a gas generator (not shown). As illustrated in FIG. 3, the primary exhaust nozzle includes a nozzle fairing 26 concentrically attached to a nozzle body 24. The forward end of the nozzle inner sleeve is connected to the gas generator or to adjoining generator structure such as an engine turbine rear frame. An aft engine mount (not shown) is used to connect the engine to a support structure (see FIG. 1), e.g., a wing strut or pylon. The downstream primary nozzle components are not attached to the support structure so that during use the nozzle can accommodate aftward thermal expansion without contacting the support structure.

Referring to FIGS. 1 and 2, the support structure is a wing pylon covered by various fairings and heat shields. Referred to herein generically as "strut fairings" 30 are a first aft pylon fairing 32, an aft pylon fairing heat shield 34, a second aft pylon fairing 36, and various heat shield castings 38. Also shown is a thrust reverser inner wall 35, a thrust reverser outer wall 37, a thrust reverser aft cowl 39, and a lower bifurcation panel 40. An annular core compartment vent exit 42 is formed by the space between the nozzle fairing 26 and the thrust reverser aft cowl 39 to vent small amounts of bypass as well as gas generator cooling air. In addition, there may be other outer structure, such as nacelle or thrust reverser components, positioned near the primary nozzle. FIGS. 1–5 omit various of these other structures in order to show aspects and features of the present invention more clearly.

With regard to fire safety elements, a number of fire zones exist within the engine installation that are designed in a manner that prohibits an engine fire from spreading. Of particular interest to the present invention is an upper quadrant fire zone located just behind the aft engine mount, between the primary nozzle and the strut fairings. In FIG. 3, the aft mount fire zone is located generally along the nozzle at the location labeled 44. Commercial aircraft propulsion systems require each fire zone to be bounded by a fire seal that is capable of containing and isolating a fire, not only from other propulsion installation components (e.g., nacelles and engine fairings), but also from areas surrounding the propulsion installation (e.g., wings, fairings, and fuselage).

In the case of the aft mount fire zone 44, a fire seal (not shown) is located along an upper arcuate region of the nozzle and oriented to prohibit flame from spreading aft of the gas generator or outward to the surrounding structures. Known fire seals, e.g., turkey feather seals, provide a solid barrier between the upper area of the primary nozzle and the strut fairings so that flame cannot pass to downstream locations. This fire seal thus protects the nozzle, the support structure, the wing structures, the various fairings and shields, and the aircraft fuselage from fire emanating rearward from the gas generator.

As shown best in FIG. 1, a region exists between the primary nozzle fairing 26 and the strut fairings at a location directly behind the aft mount fire seal. This region is termed herein a "bounded low pressure region" 48. The forward end of the bounded low pressure region 48 is defined generally by the aft mount fire seal. The bounded low pressure region aft end is defined by the primary nozzle aft end.

With regard to airflow dynamics during engine operation, fan air 52 flows along either side of the strut fairings 30. The lower surface of the aft pylon fairing heat shield 34 and the nozzle are separated by approximately the height of the core compartment vent exit 42. A low velocity cooling flow issues from the core compartment vent exit. When the core vent flow encounters the aft mount fire seal, it separates and later converges downstream of the bounded low pressure region 48.

Because of the geometry of engine components and the dynamics of airflow, there exists regions of differing velocity and/or pressure in the areas of the primary nozzle. In particular, the fan airflow is a higher velocity on either side of the bounded low pressure region, while the velocity within the region itself is low since it is a base region that is somewhat protected from the fan air 52. This pressure/velocity difference results in side-to-side air fluctuations that superimpose on the rearward-directed fan flow. The fluctuations can eventually cause nozzle vibration which is amplified when the natural frequencies of the flow fluctuations and the nozzle vibration coincide.

In general, it is desirable to eliminate flow fluctuations and structural vibrations. Thus a need exists for an engine device that accomplishes these tasks. The present invention is directed to fulfilling this need.

SUMMARY OF THE INVENTION

The present invention provides a fencing assembly for reducing interaction of fan air with a low pressure or low velocity area, such as a bounded low pressure region, of a turbofan jet engine installation. In general, a fencing assembly formed in accordance with the present invention includes one or more pairs of opposed flow control fences connected to a primary exhaust nozzle at opposite locations laterally outboard of overhead strut fairings. Each fence is includes a foot portion and an upright portion. The foot portion is connected to either the primary exhaust nozzle or the strut fairings and the upright portion extends outward from the foot portion.

In accordance with other aspects of this invention, a preferred embodiment of a fencing assembly formed in accordance with the present invention includes two pairs of opposed flow control fences. The first pair includes fences each formed as a single piece. The fences of the first pair are connected directly to the nozzle outer surface. The second pair includes fences each formed of a number of segments. The second fence pair is located aft the first pair. The segments of the second pair are connected to one face of an elongated attachment strap with the opposite strap face being connected to the nozzle.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

In general, the present invention includes a fencing assembly 66 (FIG. 3) arranged to eliminate, or at least reduce, the forces that cause primary nozzle vibration due to bounded low pressure regions such as the area behind the aft mount fire seal. The fencing assembly accomplishes this by inhibiting sideways movement of the fan air into and out of the bounded low pressure region, and by providing positive structure to force the fan air to travel aftwards in a substantially linear path. The fencing assembly generally includes one or more flow control fences 68 positioned along the lateral sides of the region 48. Though, not a part of the present invention, better results will be obtained overall if a designer practicing this invention additionally uses a nozzle that is vibration resistant.

Figure 1:
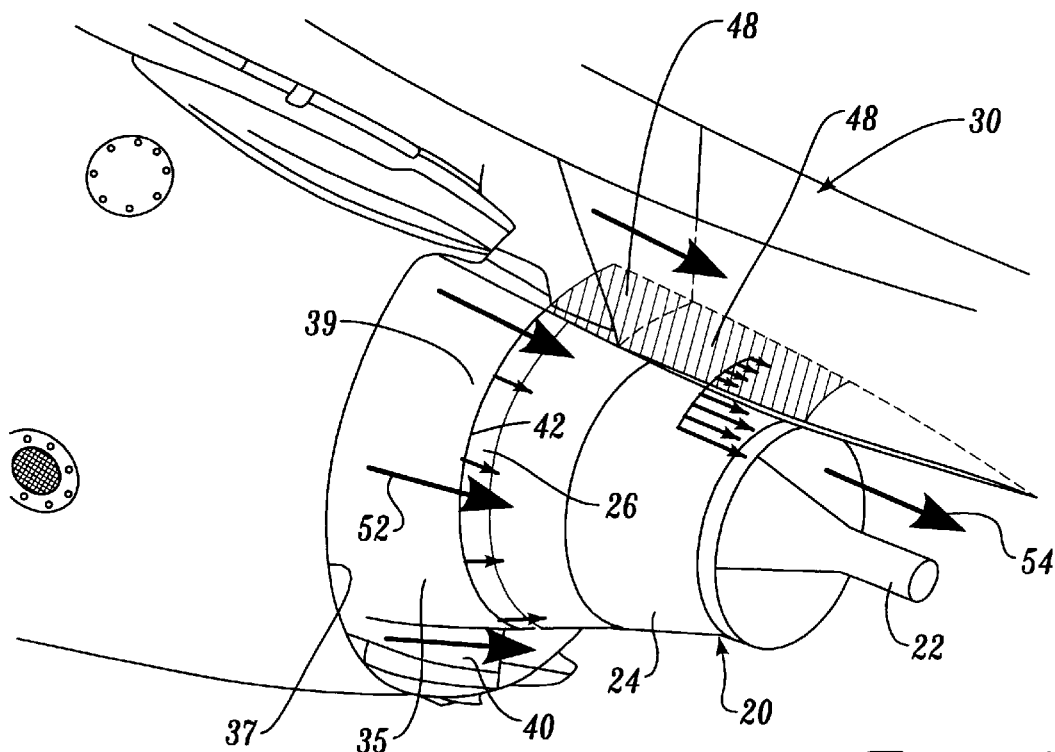
FIG. 1 is a forward-looking perspective view of rear portions of a turbofan jet engine installation.
Figure 2:
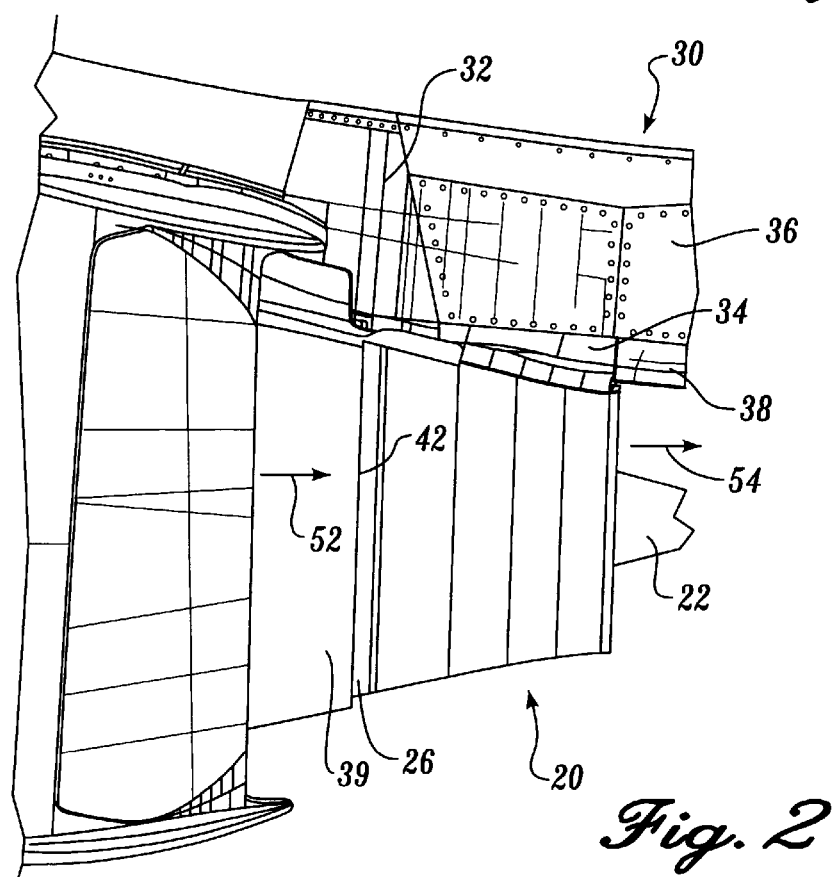
FIG. 2 is a side view of the installation of FIG. 1 with the addition of a fencing assembly formed in accordance with the present invention.
Figure 3:
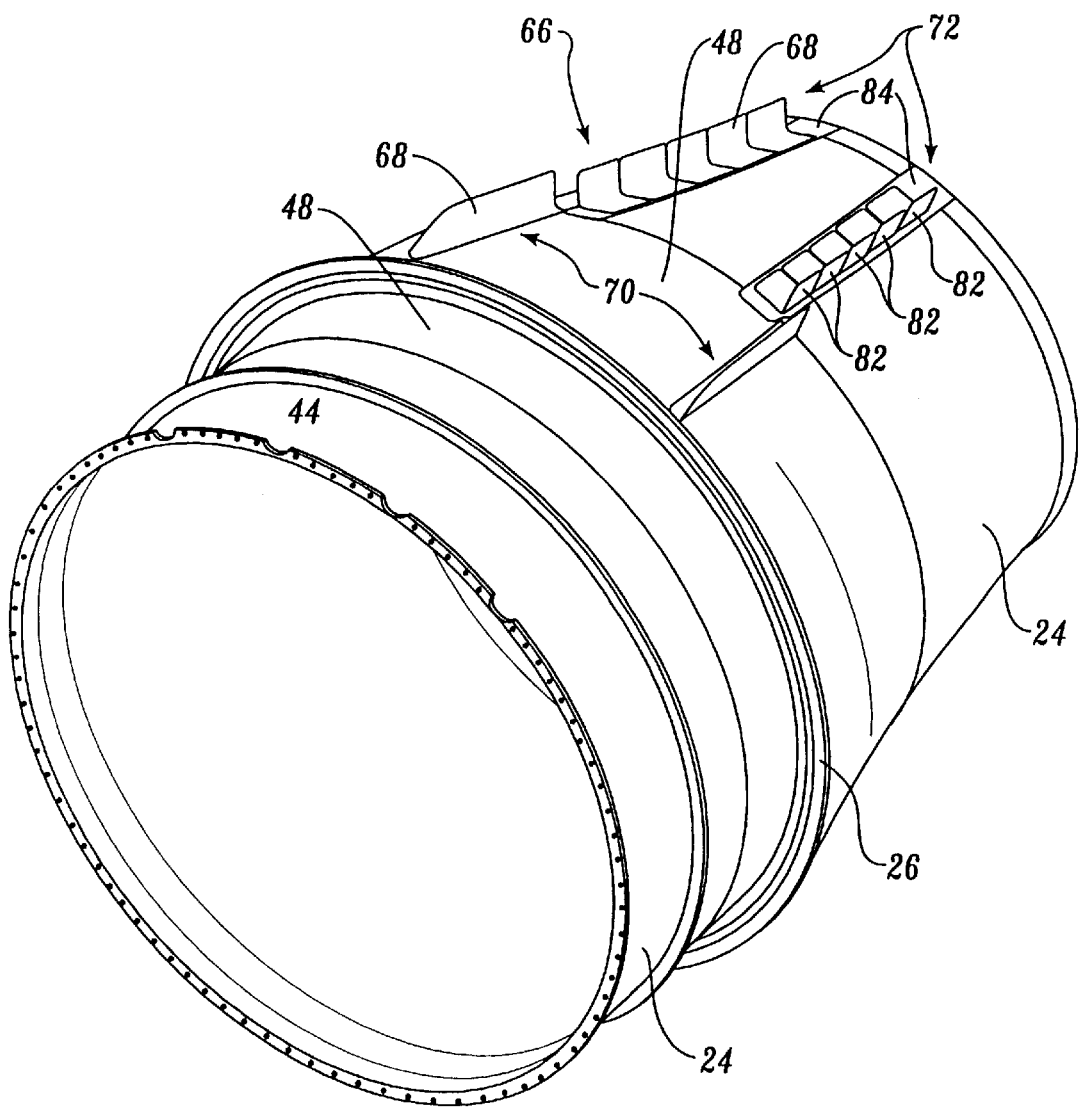
FIG. 3 is a rear-looking perspective view of the primary exhaust nozzle and fencing assembly of FIG. 2.

A preferred embodiment of a fencing assembly 66 formed in accordance with the present invention is illustrated in FIGS. 2–5. In FIG. 3, the fencing assembly includes two pairs 70, 72 of opposed flow control fences 68 located along the sides of the bounded low pressure region 48. The pairs may be connected to either the primary nozzle fairing 26 or the strut fairings 30. Shown in FIG. 3, the first pair 70 is connected to the primary nozzle fairing 26 ahead of the second pair 72. Each fence 68 is a mirror-image formation of its pair mate. The two pairs 70, 72 reduce the interaction of fan air and bounded low pressure region air, thereby reducing the amount of side-to-side flow fluctuations and hence the amount of resulting nozzle vibration.

Figure 4:
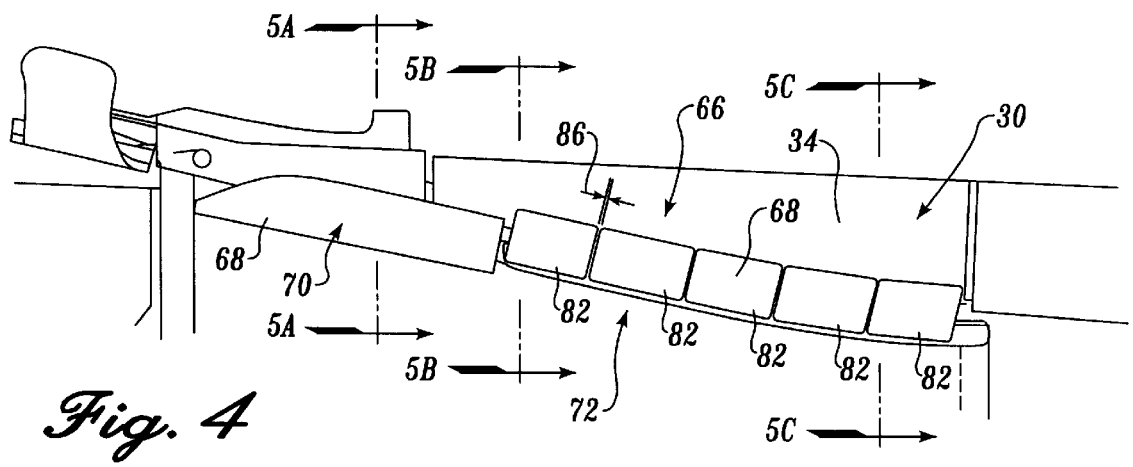
FIG. 4 is a port-side view of the fencing assembly of FIG. 2.

Referring to FIGS. 2 and 4, both fence pairs are located on the primary nozzle laterally outboard of the overhead strut fairings. This is a potentially necessary (though not necessarily desirable) feature, depending on the specific engine installation to which the present invention is being applied. Because most primary nozzles move rearwardly during use due to thermal expansion, the fences must be able to move with the nozzle without conflicting with the strut fairings. As will be appreciated from viewing FIG. 4, if the first pair of fences were placed directly under the strut fairings, they would contact downstream strut fairings during use due to downward sloping of the strut fairings in the aft direction.

Even if the specific engine application did not include sloping strut fairings, it is the inventor's belief that a slight overlap 76 of each fence with its adjacent strut fairing (see FIG. 5) provides a margin of extra flow-inhibiting protection. Preferred overlap 76 amounts are in the range of about 0.0+ to about 0.4 inches. In addition, the use of multiple pairs allows a designer to tailor the fences to strut fairings of varying width. Alternatively, a single pair of opposed fences can be formed that spans the entire nozzle length, with the fences being shaped or bent to correspond to the strut fairing shapes and widths.

Referring back to FIGS. 2 and 3, the entire fencing assembly extends to approximately the trailing edge of the primary nozzle, near the nozzle exit plane. Should primary exhaust backflow be a problem, additional fences may be located at the nozzle trailing edge.

Figure 5A:
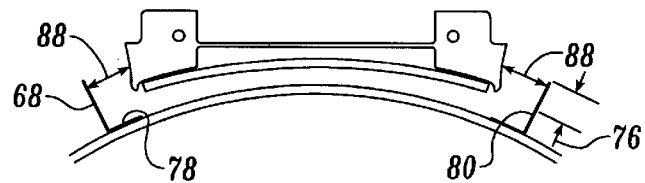
FIGS. 5A–5C are cross-sectional side views taken along lines 5A—5A, 5B—5B, and 5C—5C, respectively, of FIG. 4.
Figure 5B:
Figure 5C:
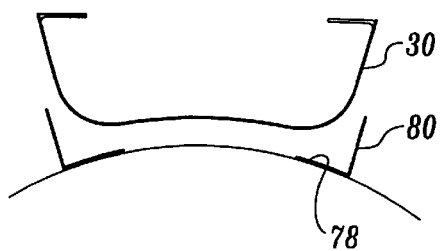

Referring to FIG. 5A, the flow control fences are generally include a foot portion 78 and an upright portion 80 extending outward from the foot portion 78. The first pair is formed as a single structure with the foot portion being connected to the nozzle fairing outer surface. The second pair is formed as a number of segments 82 aligned side-by-side and connected to one side of an elongated attachment strap 84 of which the opposite strap side is connected to the nozzle fairing outer surface. The segments 82 may be each separated by a small longitudinal distance 86 (see FIG. 4) that acts as a thermal expansion joint. For the installation of FIG. 4, the distance is in the range of about 0.05 to about 0.11 inches, As shown in FIGS. 5A–5C, the fences of both pairs also maintain a small lateral distance 88 from the strut fairings. The distance 88 will depend on the dimensions of a particular engine installation. Preferred distances for the installation of FIGS. 5A–5C are in the range of about 0.6 inch to about 2 inches. The first and second pairs of FIG. 3 are spaced laterally apart relative to one another for mechanical clearance reasons.

The fences are formed of a thickness appropriate to the installation environment. It is important is that the fences be designed and manufactured in a manner that allows them to continue to be effective throughout the various aircraft flight segments and modes of engine operation. The height of the upright portion is selected to be that height which minimizes bounded low pressure region mass flows and yet provides adequate mechanical clearance between the primary exhaust nozzle and the strut fairings in order to accommodate their relative motion during use. Alternatively, spring-like fences that are sufficiently pliable to allow fence-to-bounding-surface contact without loss of structural integrity may be used.

The fences may be formed of any one of various known materials, e.g., titanium, corrosion resistant steel, Inconel, etc. The material selected must be compatible with the material of adjoining components. Formation of the flow control fences is accomplished by bending, super plastic forming, molding, casing, forging, or any other available method. If formed separately, the fences are connected to the nozzle or fairings using any one of various known methods, e.g., riveted, bolted, welded, etc.

During use, the fencing assembly reduces fan air interaction with air in the bounded low pressure region. This greatly reduces the amount of side-to-side flow fluctuations and as a result reduces nozzle vibration. Fan air instead flows substantially linearly rearward.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a jet engine installation including a bounded low pressure region located between a primary exhaust nozzle and strut fairings, the improvement comprising a fencing assembly for reducing interaction of fan air with the bounded low pressure region, the fencing assembly including at least one pair of opposed flow control fences connected to one of the primary exhaust nozzle and the strut fairings at locations laterally outboard of the strut fairings, the at least one pair of opposed flow control fences being oriented relative to the strut fairing to form a barrier to air entering the bounded low pressure region.

2. The improvement according to claim 1, wherein the fencing assembly includes at least one pair of opposed flow control fences in which each fence is formed of a number of segments.

3. The improvement according to claim 2, wherein the number of segments are connected to one face of an elongated attachment strap, the opposite strap face being connected to the nozzle.

4. The improvement according to claim 1, wherein each flow control fence includes a foot portion and an upright portion, the foot portion being connected to the primary exhaust nozzle, the upright portion extending outward from the primary exhaust nozzle.

5. The improvement according to claim 1, wherein the at least one pair of opposed flow control fences is positioned laterally outboard of the strut fairings a lateral distance of less than about 1 inch.

6. In a jet engine installation including a bounded low pressure region located between a primary exhaust nozzle and strut fairings, the improvement comprising a fencing assembly for reducing interaction of fan air with the bounded low pressure region, the fencing assembly including at least one pair of opposed flow control fences connected to one of the primary exhaust nozzle and the strut fairings at locations laterally outboard of the strut fairings, wherein the number of segments are spaced-apart a longitudinal distance of about $\frac{1}{10}$ inches.

7. In a jet engine installation including a bounded low pressure region located between a primary exhaust nozzle and strut fairings, the improvement comprising a fencing assembly including at least one pair of opposed flow control fences, each fence being connected to the primary nozzle at locations laterally outboard of the strut fairings and oriented relative to the strut fairing to form a barrier to air entering the bounded low pressure region, each fence being positioned adjacent the strut fairing though unattached thereto; wherein at least one pair of the at least one pair of opposed flow control fences is formed of a number of segments; wherein each fence includes an upright portion extending outwardly from the nozzle.

8. A jet engine installation comprising:

(a) a jet engine capable of producing airflow;

(b) a nozzle;

(c) a support structure, a bounded low pressure region existing between portions of the nozzle and the support structure; and (d) a fencing assembly for reducing interaction of airflow with the bounded low pressure region, the fencing assembly comprising at least one pair of opposed flow control fences in which each fence is formed of a number of segments, the opposed fences being connected to or integrally formed from one of the primary nozzle and the strut fairings, each fence having an upright portion oriented outwardly from the nozzle, the at least one pair of opposed flow control fences providing a barrier to air entering the bounded low pressure region.

9. The improvement according to claim 8, wherein the fences of the at least one pair are each connected to the primary exhaust nozzle at locations laterally outboard of the support structure.

10. The improvement according to claim 8, wherein each flow control fence includes a foot portion and an upright portion, the foot portion being connected to the primary exhaust nozzle, the upright portion extending outward from the primary exhaust nozzle.

11. A jet engine installation comprising:

(a) a jet engine capable of producing airflow;

(b) a nozzle;

(c) a support structure, a bounded low pressure region existing between portions of the nozzle and the support structure, and (d) a fencing assembly for reducing interaction of airflow with the bounded low pressure region the fencing assembly comprising at least one pair of opposed flow control fences in which each fence is formed of a number of segments, the opposed fences being connected to or integrally formed from one of the primary nozzle and the strut fairings, each fence having an upright portion extending outwardly from the nozzle; wherein the fencing assembly includes two pairs of opposed flow control fences, a first pair including fences each formed as a single piece, a second pair including fences each formed of a number of segments; wherein the second pair is located aft of the first pair.

12. The improvement according to claim 11, wherein the number of segments are connected to one face of an elongated attachment strap, the opposite strap face being connected to the nozzle.

* * * * *